United States Patent [19]

Bonvini

[11] Patent Number: 4,936,765

[45] Date of Patent: Jun. 26, 1990

[54] AUTOMATIC SINTERING MACHINE WITH DIE COOLING DEVICES

[75] Inventor: Giuseppe Bonvini, Piacenza, Italy

[73] Assignee: Sintris S.r.l., Via Contestabili, Italy

[21] Appl. No.: 233,736

[22] Filed: Aug. 19, 1988

[30] Foreign Application Priority Data

Sep. 11, 1987 [IT] Italy .............................. 44809 A/87

[51] Int. Cl.[5] .............................................. B29C 43/52

[52] U.S. Cl. ...................................... 425/144; 100/93; 100/207; 425/150; 425/174.4; 425/174.8 R

[58] Field of Search ............... 425/135, 143, 144, 145, 425/150, 155, 158, 160, 169, 174, 174.4, 174.8 R, 261, 259, 359, 384, 406, 423, 174.8 E, 407, 411; 156/311, 498, 359, 361, 364; 100/93 P, 207

[56] References Cited

U.S. PATENT DOCUMENTS

| | | | |
|---|---|---|---|
| 2,912,717 | 11/1959 | Yarrison et al. | 425/150 |
| 3,170,189 | 2/1965 | Hütter | 100/207 |
| 3,724,988 | 4/1973 | Gouws | 425/359 |
| 4,244,683 | 1/1981 | Rowland | 425/411 |
| 4,349,310 | 9/1982 | Schneider et al. | 100/207 |
| 4,378,592 | 3/1983 | Heiberger et al. | 100/207 |
| 4,392,909 | 7/1983 | Bohn et al. | 100/207 |
| 4,414,887 | 11/1983 | Orll | 100/207 |
| 4,543,147 | 9/1985 | Noto et al. | 100/207 |
| 4,776,919 | 10/1988 | Troutner et al. | 100/93 P |
| 4,817,177 | 4/1989 | Jurgensen | 425/144 |

*Primary Examiner*—Willard Hoag

*Attorney, Agent, or Firm*—Notaro & Michalos

[57] ABSTRACT

A sintering machine is equipped with die cooling plates coupled to the heating and sintering plates. An automatic conveyor conveys the dies first to the pressing and heating plates and then, at the end of the sintering cycle, to the cooling plates. This eliminates the need to cool the sintering plates, with the result that sintering operations are performed more rapidly and energy consumption is drastically reduced.

4 Claims, 3 Drawing Sheets

AUTOMATIC SINTERING MACHINE WITH DIE COOLING DEVICES

FIELD AND BACKGROUND OF THE INVENTION

This invention relates to an automatic sintering machine equipped with die cooling systems coupled to the sintering plates.

The machine is equipped with systems which automatically convey the dies to the heating plates, and subsequently, at the end of the cycle, to the cooling plates.

The machine is controlled by electronic devices which control the various functions, and is equipped with an optical pyrometer designed to detect the die temperature which is connected to the movable plate so that it always remains perfectly centered, regardless of the plate movements caused by the reduction in volume of the material sintered.

Known sintering machines basically consist of a press into which the die and the material to be sintered are introduced, equipped with systems designed to heat the plates which press on the die, heating it to the temperature required for this operation.

Known sintering machines, all of which are fitted with a single pair of plates, present the drawback that at the end of the sintering cycle it is necessary to wait a few minutes for the die to cool before removing it, failing which the finished product can present numerous defects.

In addition to wasting time, this system also involves very high energy consumption, as first the die and then the support and compression plates must be heated to a high temperature and then cooled, wasting much of the heat developed, which will have to be produced again for the next sintering cycle.

In addition, the temperature reached is a critical factor in obtaining a good result, and it must therefore be measured with the greatest precision.

Optical pyrometers which can be positioned and secured as required along a fixed support are generally used for this purpose.

Another drawback of known machines relates to the fact that, as already mentioned, the material sintered is reduced to about a fifth of the initial volume, with the result that it is difficult to monitor temperature variations precisely with a fixed-position pyrometer.

SUMMARY OF THE INVENTION

To eliminate these difficulties, this invention presents a sintering apparatus equipped with a pair of die cooling plates coupled to the heating and sintering plates, and pyrometer supports which move with the die.

The machine is completed by a conveyor which conveys the dies in succession first to the sintering station and then to the cooling station.

BRIEF DESCRIPTION OF THE DRAWINGS

The invention will now be described in detail, by way of example but not of limitation, by reference to the annexed figures in which.

DESCRIPTION OF THE PREFERRED EMBODIMENT

Figure 1:
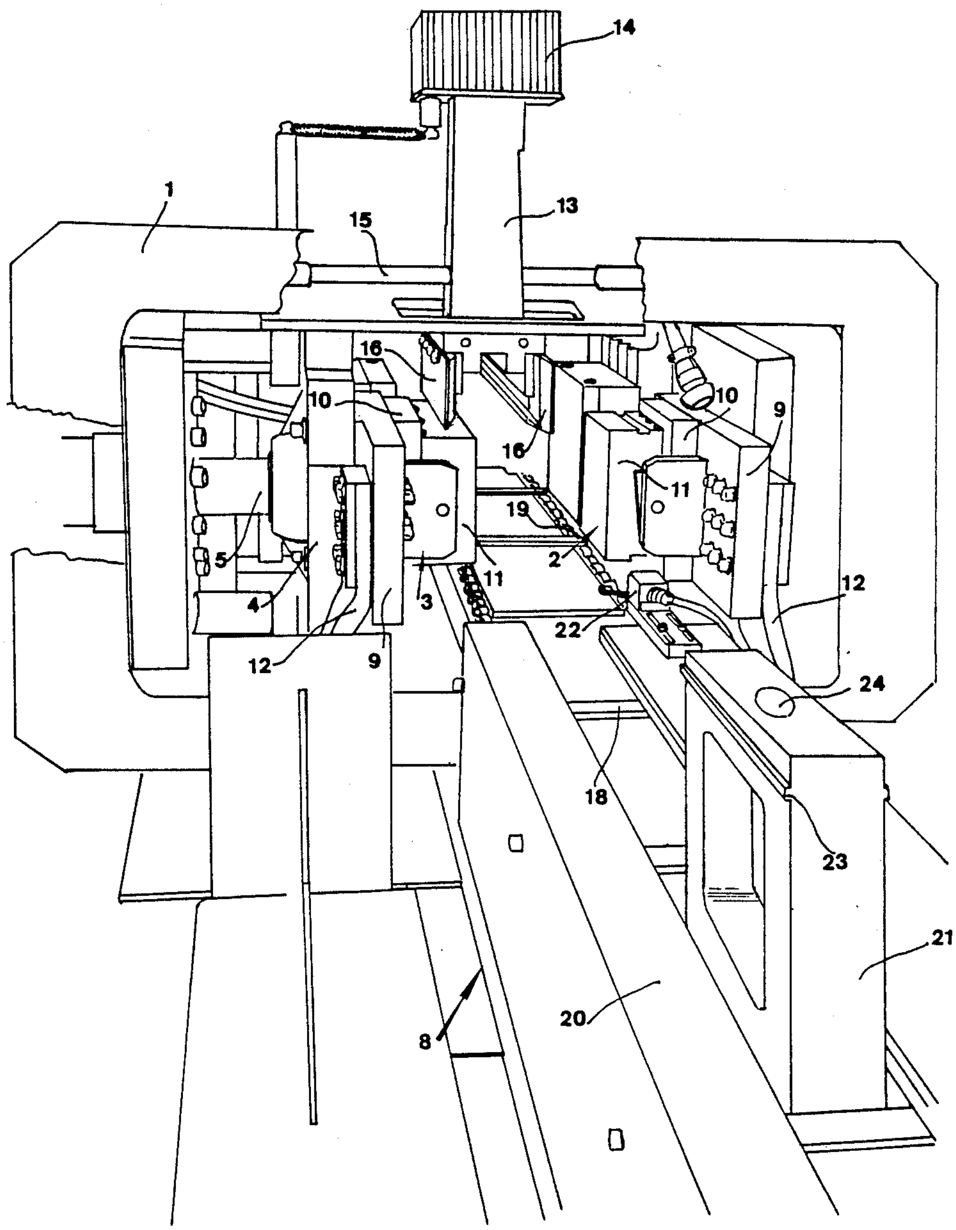
FIG. 1 shows the perspective view of a detail of the machine in accordance with the invention, illustrating the automatic die introduction devices and the heating plates.
Figure 2:
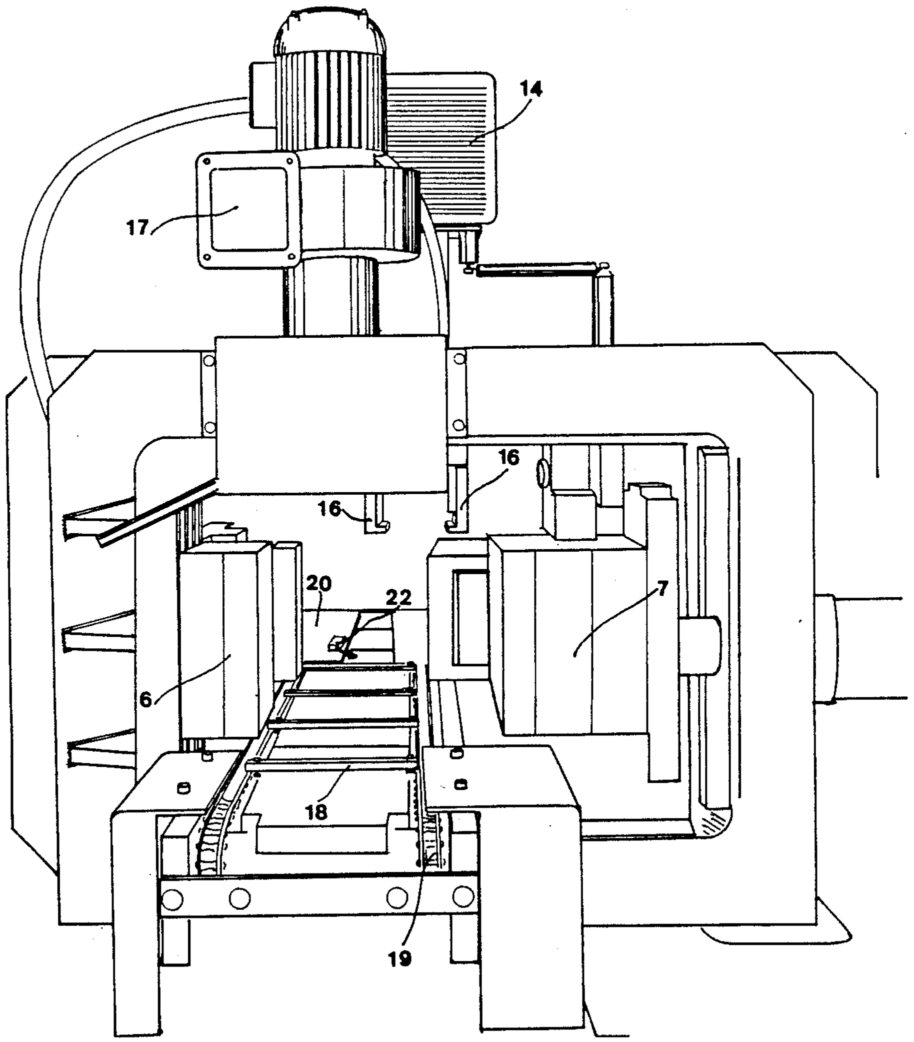
FIG. 2 shows a partial view of the machine seen from the opposite side to the view shown in FIG. 1, illustrating the die conveyor devices and cooling plates.

The machine basically consists of a hydraulic press which presses the material to be sintered (contained in a die), systems which heat the die during pressing, systems which cool the die after sintering, and electronic systems which control the various functions of the apparatus.

In particular, the machine forming the subject of this invention comprises a casing 1 which supports a set of fixed plates 2 and a set of movable plates 3, connected to a support 4 which in turn is fixed to rod 5 of a hydraulic piston driven by systems which are not illustrated as they are of known type.

Plate sets 2 and 3 heat the material sintered as well as pressing it. Plates 6 and 7 (fixed and movable respectively), which cool the dies fed through the machine by conveyor 8, are located down-line of plate sets 2 and 3.

In particular, plate sets 2 and 3, hereafter called "heating plates", each consist of an outer silver-plated copper plate 9 fixed to a plate 10, generally made of graphite, which is in contact with a further plate 11, called the electrode.

Leads 12, wired to a transformer which supplies the current required to heat the die, are connected to plate 9.

When the die is clamped between the plates the electrical circuit is closed, allowing the passage of current which heats the die by induction.

The surface of electrode 11 which rests on plate 10 contains a series of milled grooves which reduce the contact surface, allowing the required amount of current to pass but limiting the transfer of heat which would be lost.

Intermediate graphite plate 10 is necessary as if the electrode rested directly on plate 9, which is kept at a lower temperature by a cooling circuit, it would produce rapid wear of that plate at the points of contact, thus impeding the passage of current to an unacceptable degree, particularly whenever the electrode needs to be replaced.

Support 13 of an optical pyrometer 14 is also fixed to support 4 of movable plate set 3. Pyrometer 14 runs along a pair of tubular guides 15 or similar, located in the top of casing 1. A guide with a pair of side walls 16 is fitted below suppport casing 1; the bottom of each guide wall forms an inward-facing ledge into which the die holders are inserted, as described below.

An extractor 17 is fitted to the top of the structure to exhaust the fumes generated during sintering.

As mentioned, cooling plates are installed down-line of the heating plates. The first cooling plate (6) is fixed to the structure, while the second (7) is driven by hydraulic systems similar to those which govern the movements of plates 3.

A circuit in which coolant fluid circulates runs through plates 6 and 7.

Conveyor unit 8, which basically comprises a slat conveyor consisting of a number of slats 18 fixed at the ends to a pair of drive chains 19, is installed between and below the two sets of plates.

Guides 20 of die holder 21 are fitted along the first stretch of the route (FIG. 1) above slats 18. In the figures the die holders are shown without a die in place.

The die holder is placed on conveyor 8 between two slats 18, which draw it forward along guides 20.

Microswitch 22, activated by the die holder, is fitted close to the end of guides 20.

The end-of-travel position of movable plate set 3 is regulated by a microswitch so that when the plate is open, guides 16 fixed to the pyrometer support are positioned exactly over the route of die holder 21.

A pair of runners 23 at the top of the die holder are inserted between guides 16 and rest on the ledges.

As plate set 3 advances, it therefore also moves support 13 and die holder 21.

When the die holder is inserted between guides 16, hole 24 in the top of the holder is positioned exactly beneath the pyrometer reader, which is thus able to measure the die temperature.

This guarantees that the pyrometer remains perfectly centered on the die at all times, regardless of the movements made by plate set 3 as a result of compression of the material during sintering.

The current required to heat plate sets 2 and 3 is supplied by a three-phase transformer with rectifier diodes, SCR diodes which regulate the power supply to the primary, and cooling circuit.

All these devices are already known or illustrated in other applications made by the same applicant, and are therefore not described in detail.

Figure 3:
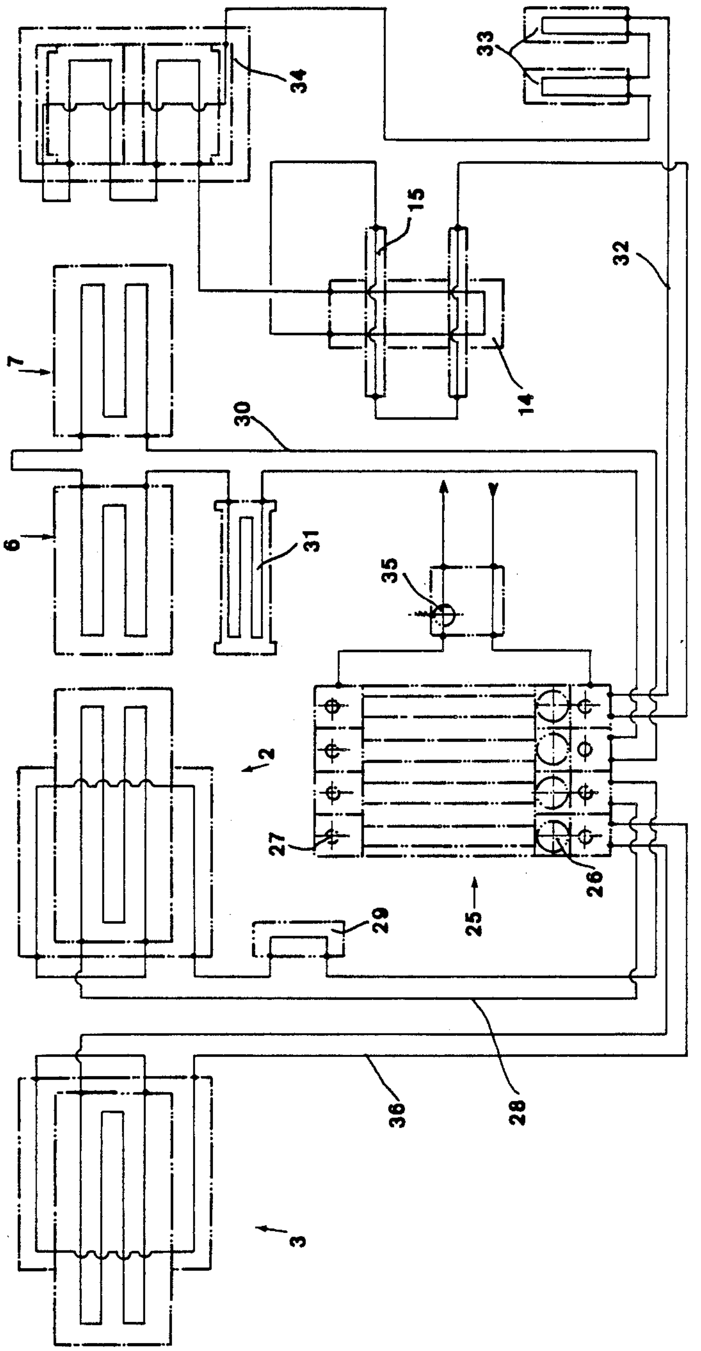
FIG. 3 shows the hydraulic diagram of the cooling circuit of a machine in accordance with the invention.

The cooling circuit cools other parts of the machine as well as plates 6 and 7. FIG. 3 shows the diagram of this circuit, which comprises a number of distinct branches connected to a single regulator, the regulator assembly being indicated as no. 25.

Each branch contains coolant temperature detection systems 26 and regulators 27 which constrict the outlet to regulate the flow of fluid.

Branch 36 of the circuit cools movable plates 3, while a second branch comprises one part 28 which cools fixed plates 3, and another part 29 which cools the casing in the areas near the transformer which tend to be heated by induction.

A third branch (30) of the circuit is directed to cooling plates 6 and 7, and a heat exchanger 31 is suitably fitted to it.

The last branch (32) of the circuit cools SCR diodes 33 located on the transformer primary, and cools transformer 34 and pyrometer guides 15.

A flow switch 35 is fitted on the water inlet and drainage circuit at regulator 25.

The machine operates as follows:

A set of die holders (each with die not shown) is placed on conveyor 8; the die holders rest on the conveyor surface between slats 18.

When the machine is started up the conveyor advances, pushing the first die holder, which is inserted into guides 16, until it arrives between plate sets 2 and 3.

This condition is detected by microswitch 22, which gives the advance enable signal to plates 3 when the die holders are in position. Plates 3 push the die not shown against fixed plates 2, closing the power circuit and allowing the passage of current, which heats both the electrodes and the die by induction.

The temperature is constantly monitored by pyrometer 14, which sends the corresponding pulses to a control computer; the computer operates SCR diodes 33 accordingly to regulate the passage of current and consequently the heating of the die.

As sintering proceeds, the material in the die is compressed and the movable plate set advances, drawing along with it the pyrometer, which remains perfectly centered on the die.

At the end of the operation plates 3 retract and the computer gives the conveyor advance enable signal. The first die is conveyed to plates 6 and 7, and the second is moved along one place until it is positioned between the heating plates.

At this point the cycle begins again with a new sintering stage, while plates 6 and 7 cool the first die.

The use of two stations—a sintering station and a cooling station—enables the operation to be performed much faster and saves a considerable amount of energy.

Before the die is removed the temperature must be reduced from approx. 800° C. to approx. 300°–400° C.; this causes a considerable amount of the heat produced to be lost, and requires the machine to be shut down during the cooling period.

The machine in accordance with this invention, however, is designed so that the electrodes can be kept at a high temperature and a new sintering cycle started immediately, while the previous die is being cooled in the second station.

An expert in the field could devise numerous modifications and variations, all of which should be deemed to be included in the ambit of this invention, limited only by the claims.

I claim:

1. Automatic sintering machine comprising:

a pair of heating plates at least one of which being movable to clamp and to press and heat a material to be sintered in a die;

a pair of cooling plates located down-line of the heating plates, at leasst one of which being movable to clamp and to cool the die;

conveyor means for conveying a set of dies in succession to said pairs of plates; and electronic apparatus control means connected to the plates and to the conveyor means for controlling the movement, the heating and the cooling of the plates and the movement of the conveyor means;

the heating plates comprising a silver-plated copper plate, an intermediate plate made of a different material, and an electrode fixed to the intermediate plate, the electrode having grooves to limit the surface thereof which is in contact with the intermediate plate, and for allowing a necessary current to pass while limiting the passage of heat.

2. Sintering machine according to claim 1, wherein the control means includes a cooling means, comprising plural branches, each having an independent control means for regulating cooling and being located in heating plates, cooling plates, power supply units and a support structure for the apparatus.

3. An automatic sintering maching comprising:

a pair of heating plates at least one of which being movable to clamp and to press and heat a material to be sintered in a die;

a pair of cooling plates located down-line of the heating plates, at least one of which being movable to clamp and to cool the die;

conveyor means for conveying a set of dies in succession to said pairs of plates;

electronic apparatus control means connected to the plates and to the conveyor means for controlling the movement, the heating and the cooling of the plates and the movement of the conveyor means; and die temperature detection means and a movable heating plate support integral with the detection means for one of the heating plates, the detection means including an optical pyrometer support integral with the movable heating plate support, and a guide fixed to the pyrometer support for insertion of a die during sintering.

4. Sintering machine according to claim 3, wherein the control means includes a cooling means, comprising plural branches, each having an independent control means for regulating cooling and being located in heating plates, cooling plates, power supply units and a support structure of the apparatus.

* * * * *